Nov. 3, 1970  E. GADD  3,538,422
R.F. TRANSIENT SUPPRESSION FOR GENERATING MACHINE
Filed May 20, 1968
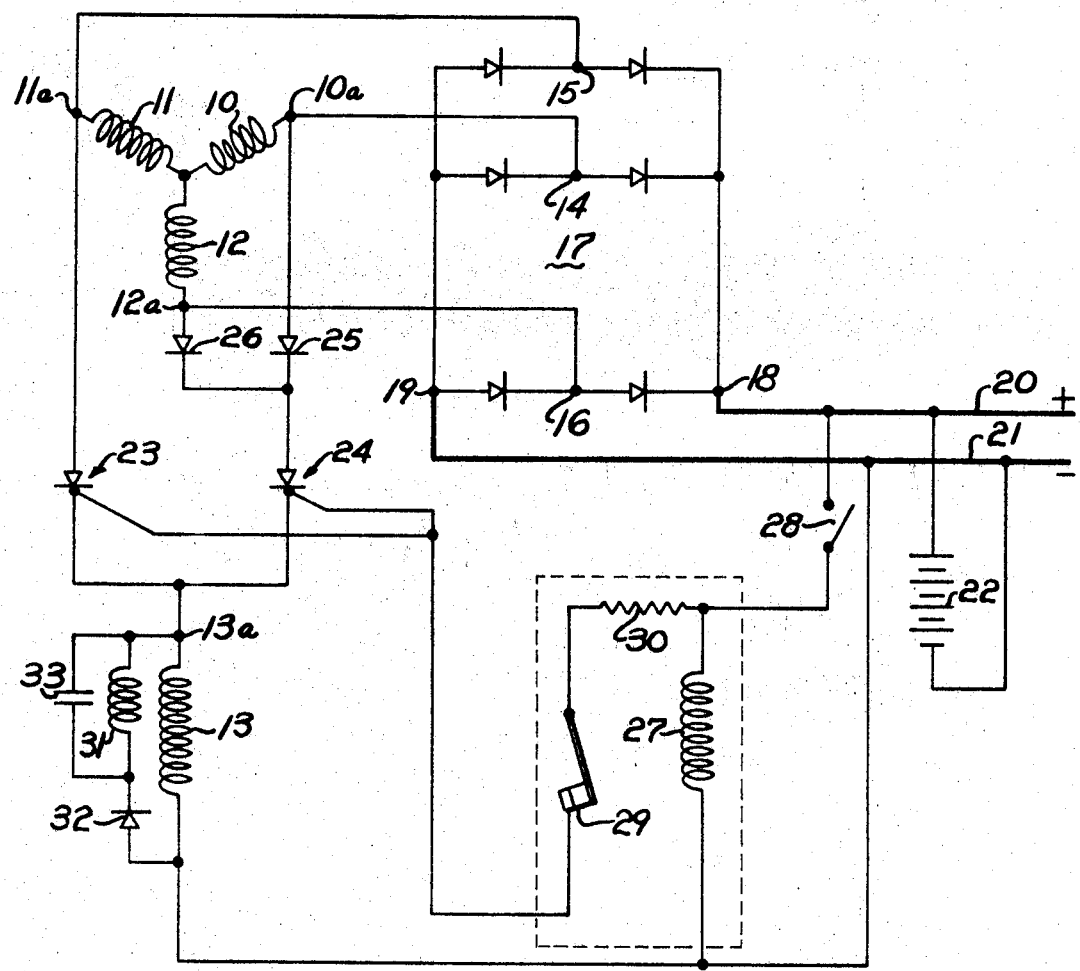
INVENTOR.
EDWARD GADD
BY
Yount, Flynn & Tarolli
ATTORNEYS

United States Patent Office 3,538,422
Patented Nov. 3, 1970

3,538,422
R.F. TRANSIENT SUPPRESSION FOR GENERATING MACHINE
Edward Gadd, Cleveland, Ohio, assignor to Victoreen Leece Neville, Inc., a corporation of Ohio
Filed May 20, 1968, Ser. No. 730,483
Int. Cl. H02k 11/00
U.S. Cl. 322—58                                5 Claims

ABSTRACT OF THE DISCLOSURE

A parallel L-C circuit, including an R.F. choke coil and a capacitor, is connected in series with the field discharge rectifier for the field winding of an alternator on an automotive vehicle to suppress radio frequency transients caused by the abrupt de-energization of the alternator field winding.

---

This invention relates to the suppression of radio frequency transients produced by the abrupt de-energization of the input winding of a voltage generating machine, such as an alternator, on an automotive vehicle under the control of a regulator which regulates the machine output.

Various regulators have been proposed which control the energization of the input winding of a voltage generating machine, such as an alternator, on an automotive vehicle. Such regulators are provided for regulating either the output voltage or output current, or both, from the generating machine to a load which includes the vehicle battery. Such regulators are commonly provided with one or more switching devices, such as transistors, silicon controlled rectifiers or switches with movable contacts, to conduct current from the output side of the generating machine to its input winding as long as the machine output (voltage, current, or both) does not exceed the value for which the regulator has been set. When the machine output exceeds this value, the switching device or devices abruptly interrupts this current to the input winding of the machine. When the input winding is provided with a discharge rectifier, the stored electromagnetic energy in the input winding is abruptly discharged through this rectifier. This can cause radio frequency transients which can interfere with the operation of radio communication equipment on the vehicle, and it is the purpose of the present invention to overcome this problem.

Accordingly, it is a principal object of this invention to provide, in a system having a voltage generating machine and a discharge rectifier for the input winding of the machine, an R.F. choke coil connected in series with the discharge rectifier and having a sufficiently high inductance to effectively suppress radio frequency transients which may occur when the input winding of the machine is abruptly de-energized.

Another object of this invention is to provide in such a system a parallel L-C circuit, comprising an R.F. choke coil and a capacitor, connected in series with the discharge rectifier for the input winding of the machine and having a high impedance over a range of radio frequencies so as to effectively suppress any radio frequency transients in this range which may be produced when the input winding is abruptly de-energized.

Further objects and advantages of the present invention will be apparent from the following description of an alternator and regulator system which embodies the present invention and which is illustrated schematically in the single figure of the accompanying drawing.

Referring to the drawing, the present invention is shown in conjunction with a voltage generating machine in the form of an alternator for an automotive vehicle, and a regulator for the alternator, as disclosed in U.S. Pat. 3,230,442 to John W. Korda, as one illustrative example of a system in which the present invention may be embodied.

The alternator has three-phase Y-connected inductor phase windings 10, 11, 12, which are the output windings of the machine, and a field winding 13, which is the input winding of the machine. The phase windings 10, 11, 12 have output terminals 10a, 11a, 12a respectively connected to input terminals 14, 15, 16 of a full-wave rectifier 17. The full-wave rectifier 17 has positive and negative output terminals 18, 19 connected to supply a current to positive and negative load conductors 20, 21 across which the battery 22 may be connected.

The output of the alternator is controlled by controlling the direct current energization of the field winding 13 from the phase windings of the alternator. To this end, the positive terminal 13a of the field winding 13 is connected to the output terminal 11a of the phase winding 11 through a switching device constituted by a silicon controlled rectifier 23. The positive terminal 13a of the field winding 13 is also connected to the respective output terminals 10a and 12a of the phase windings 10 and 12 through a switching device constituted by a silicon controlled rectifier 24. The anode of the SCR 24 is connected to the phase winding output terminals 10a and 12a through respective blocking diodes 25 and 26. If the phase winding output terminal 10a is positive with respect to the phase winding output terminal 12a and with respect to the positive terminal 13a of the field winding, the diode 25 will be conductive, provided the SCR 24 is switched on. If the phase winding output terminal 12a is positive with respect to the phase winding output terminal 10a under the same conditions, the diode 26 will be conductive. Consequently, for practical purposes, the current supplied to the field winding 13 through the SCR 24 is supplied either through the diode 25 or through the diode 26.

Each controlled rectifier 23 and 24 is rendered conductive when its anode is positive with respect to its cathode, by applying a current signal to its gate electrode. The polarity of the current signal required to render the SCR conductive is such that the gate electrode is positive with respect to the cathode and the switching current flows between the gate electrode and the cathode of the SCR to render it conductive. Once the SCR has been rendered conductive, the gate electrode loses control and the SCR is subsequently extinguished when the anode current falls below the holding value.

"On" gating currents are applied to the gate electrodes of the SCR's when the output voltage of the machine falls to a predetermined level, and the gating currents are discontinued when the machine output voltage subsequently rises to a predetermined higher level.

The "on" gating currents are controlled by a regulator arrangement which senses the magnitude of the output voltage of the machine. This regulator comprises a voltage-sensing relay having a coil 27 connected across the load conductors 20, 21 with one side of the relay coil 27 being connected to the positive load conductor 20 through a switch 28. When the relay coil 27 is sufficiently energized, it opens a set of normally closed contacts 29 which connect the gate electrodes of the SCR's 23 and 24 to the positive load conductor 20 through the switch 28 and a resistor 30, which is connected between the relay contacts 29 and the switch 28. When the relay coil 27 is not sufficiently energized, the contacts 29 are closed.

The relay is actuated by the voltage output at the higher level of the regulation to be maintained and has a drop-out voltage where the contacts 29 close at a lower level of the voltage output. Consequently, the contacts 29 will be opened when the higher level of regulation is reached for the output of the machine and will remain open until the level drops to the lower level of regulation where the contacts will again close. Such voltage-sensing relays are well known to those skilled in the art.

When the contacts 29 and the switch 28 are closed, "on" gating current will flow from the positive load conductor 20 through the gate electrode of each of the SCR's 23, 24 and their cathodes to the positive terminal 13a of the field winding 13 and through the field winding to the negative load conductor 21 to switch the SCR's 23 and 24 on when their anodes are sufficiently positive with respect to their cathodes. It will be noted that the control current flows through the field winding 13 to add to the residual magnetism and build up the voltage when the alternator is started.

With the "on" gating currents established in the SCR switch devices 23 and 24, the devices will conduct current from the phase windings 10, 11, 12 of the alternator to the fields winding 13 when the respective phase winding output terminals 10a, 11a, 12a to which the SCR switching devices 23, 24 are connected are sufficiently positive with respect to the negative load conductor 21 so that the anodes of the SCR switching devices will be positive with respect to their cathodes. When the "on" gating signals are applied to the gate electrodes, the SCR 23 or 24 whose anode is the more positive will conduct. If this is the SCR 24, the blocking diode 25 or 26 whose anode is at the higher potential will be conductive and the other will be non-conductive. Consequently, one phase winding at a time will supply current, but current will be available for substantially the entire alternator cycle. Each of the SCR's 23, 24 will be extinguished during the cycle when its anode current falls to about zero, but will again be switched on when the anode is positive with respect to the cathode, provided the relay contacts 29 are still closed to provide the "on" gating signal.

As the output of the machine comes up to the higher level of regulation, the relay coil 27 will open the contacts 29 and break the circuit for the control current to the gate electrodes of the SCR's 23 and 24. The conductive one of the SCR's will continue to conduct after the gate current is interrupted until the anode current of the SCR drops below its holding current and this will occur when the phase winding output terminal or terminals to which the anode of this SCR is connected drops to the same voltage as the positive terminal 13a of the field winding or below. Each phase winding output terminal 10a, 11a, 12a will fall below the potential of field winding terminal 13a for a period during each cycle of the alternator and therefore both SCR's 23 and 24 will be extinguished and rendered non-conductive within a cycle of operation after the "on" gating signal is removed from the gate electrodes, thereby causing the alternator field winding 13 to be abruptly de-energized.

In accordance with the present invention, a coil 31 having a relatively high inductance is connected in series with the usual field discharge rectifier 32 across the field winding 13 of the alternator. The common practice is to provide a field discharge rectifier connected directly across the alternator field winding to rapidly dissipate the stored electromagnetic energy in the field winding when the field winding is abruptly de-energized. A rectifier of the proper polarity connected in this manner provides essentially a short-circuit for current produced by the collapse of flux in response to the de-energization of the field winding.

The present invention is based upon the recognition that such rapid dissipation of the stored electromagnetic energy produces transient voltages which appear as damped sinusoidal oscillations at radio frequencies, which can interfere with radio communications equipment on the vehicle, such as radio receivers or radio transmitters.

In accordance with the present invention the coil 31 is connected in series with the field discharge rectifier 32 to delay this collapse or dissipation of the electro magnetic energy stored in the alternator field winding 13. Because this energy collapse is made more gradual, the amplitude of the transient oscillations is greatly reduced. The inductance of coil 31 is sufficiently high to cause radio frequency transients to be substantially suppressed to a level where they do not significantly affect the communication equipment on the vehicle.

Preferably, a capacitor 33 is connected across the coil 31 to provide a parallel L-C circuit which has an extremely high impedance over a range of radio frequencies so as to improve the suppression of R.F. transients in the operating frequency range of the radio communications equipment on the vehicle.

While the present invention has been shown in association with a particular type of alternator and regulator system it is to be understood that this invention may be applied to a wide variety of such systems and is not limited to use with the particular system shown.

Having described my invention, I claim:

1. In combination with a voltage generating machine having an field winding, and circuit means controlling the energization of the field winding for energizing the field winding with direct current and for de-energizing the field winding depending upon the machine output, a field discharge rectifier and coil means connected in series with each other across said field winding, said rectifier having a polarity effective to discharge through said coil means the stored energy in said field winding when the latter is de-energized, and said coil means having a sufficiently high inductance to substantially suppress radio frequency transients produced by the discharge of said stored energy.

2. The combination of claim 1, and further comprising capacitor means connected to said coil means to provide an L-C circuit having a high impedance over a range of radio frequencies.

3. The combination of claim 2, wherein said capacitor means is connected in parallel with said coil means.

4. In combination with an alternator for an automotive vehicle provided with radio communications equipment, said alternator having a field winding, regulator means connected to sense the magnitude of the alternator output and including switch means for either energizing said field winding with direct current or de-energizing said field winding depending upon the magnitude of the machine output, a field discharge rectifier and an R.F. choke coil connected in series with each other across said field winding, said rectifier having a polarity effective to discharge the electromagnetic energy stored in said field winding upon de-energization of the latter, and said choke coil having a sufficiently high inductance to substantially suppress radio frequency transients produced by the discharge of said stored energy.

5. The combination of claim 4, and further comprising a capacitor connected across said choke coil to provide a parallel L-C circuit which has a high impedance over the range of radio frequencies at which the radio communications equipment on the vehicle operates.

References Cited
UNITED STATES PATENTS

| | | | |
|---|---|---|---|
| 1,376,425 | 5/1921 | Fortescue | 322—58 |
| 2,705,759 | 4/1955 | Taggart | 307—105 |
| 3,230,442 | 1/1966 | Korda | 322—28 |
| 3,346,801 | 10/1967 | Reid et al. | 322—58 |

ORIS L. RADER, Primary Examiner

H. HUBERFIELD, Assistant Examiner

U.S. Cl. X.R.

307—93, 105